Nov. 6, 1934.
T. C. SMITH
1,979,414
DIFFERENTIAL MECHANISM
Filed Nov. 22, 1933
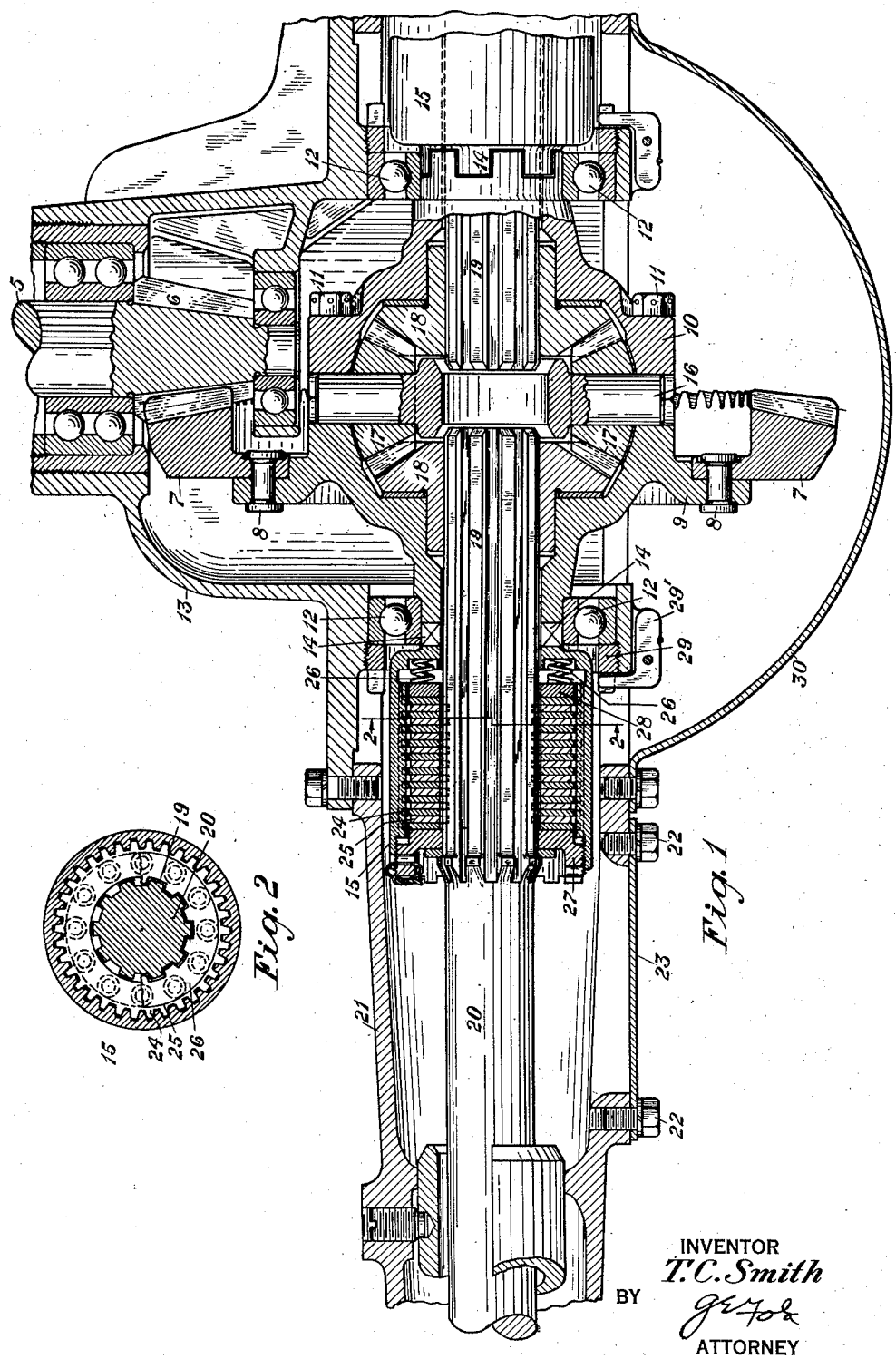
INVENTOR
T. C. Smith
BY
ATTORNEY Patented Nov. 6, 1934

1,979,414

UNITED STATES PATENT OFFICE

1,979,414

DIFFERENTIAL MECHANISM

Temple Clifford Smith, Westfield, N. J., assignor to American Telephone and Telegraph Company, a corporation of New York Application November 22, 1933, Serial No. 699,243

4 Claims. (Cl. 74—315)

This invention relates to differential mechanism which is more particularly adapted for use with motor vehicles.

It is one of the objects of this invention to provide differential mechanism which requires the transmission of a certain minimum torque to either of the two rear wheels of a motor vehicle before differential action starts due to lack of traction on the other wheel.

Another object consists in the provision of an automatically-operated differential brake which may be readily adjusted to regulate the amount of torque to be applied.

Another object is to provide a self-contained unit which may be readily installed or removed.

A further object is to provide a differential brake which will cause both rear wheels to turn together until a certain predetermined difference in wheel torque is reached, regardless of whether power is being applied from the engine or not.

These and further objects will be apparent from the following description, when considered in connection with the accompanying drawing, in which one embodiment of the invention is illustrated.

Referring to the drawing, Figure 1 is a sectional plan view of the improved differential brake mechanism and associated differential and drive shaft, showing said mechanism applied to the rear axles of a motor vehicle, and Fig. 2 is a section taken on the line 2—2 of Fig. 1.

In the drawing, the reference character 5 designates a drive shaft through which power is transmitted from an engine of a motor vehicle in a well understood manner. While the draft shaft 5 is shown and will be presently described as being associated with a certain type of differential by which the rear axles of a motor vehicle may be driven, it will be obvious that any other type of differential may be used in connection with the present invention. The drive shaft 5 is provided with a pinion 6 which meshes with a drive or ring gear 7. The gear 7 is shown riveted at 8 to one section of a differential casing 9. A second section of this differential casing is shown at 10 and may be attached by bolts to the first mentioned section and rotates therewith. The differential sections 9 and 10 are journaled in bearings 12, carried in a housing or drive pinion carrier 13. A permanently engaged flexible coupling 14 is provided between the differential casing 9 and a differential brake unit or rotating element 15 to be presently described.

Shafts 16 which rotate with the differential casing 9 in a well known manner are provided with four bevel pinions, two of which are shown at 17. These pinions engage with teeth on bevel pinions 18, and the interior or hubs of the pinions 18 are provided with splines which engage with splined portions 19 on the left-hand and right-hand axle shafts 20. These axle shafts have the usual wheels (not shown) mounted on their outer ends. A housing 21 which may be bolted to the element 13 is provided for the axle shafts 20, and these housings extend outwardly to points abutting the wheels. The axle shafts 20 are driven in the usual manner by power transmitted from the drive shaft 5, through gear 7, which in turn cause the rotation of the sections 9 and 10 of the differential casing and these sections rotate the pinions 17 through the shafts 16. The teeth on the pinions 17 which engage the teeth in the bevel gears 18 cause the rotation thereof, and these gears 18 through their interior splined or hub portions which engage with the splines 19 on the left and right axle shafts 20 cause the rotation of these shafts and their wheels.

The differential brake units 15, which may surround one or both of the axle shafts 20 each have casings which are rotated by their associated differential casings 9 and 10 through the respective permanently engaged flexible coupling 14. In the drawing the brake unit 15 associated with the left axle shaft is shown in section, and the brake unit associated with the right axle shaft is shown with its exterior casing partly broken away. While two differential brake mechanisms, one on each side of the differential carrier and associated with each of the axle shafts, are herein illustrated and described, it will be understood that only one such mechanism will introduce the desired differential action by locking through the differential spur gears. The second brake mechanism increases this locking action. The brake units are each enclosed in a cylindrical housing and may be readily installed or removed. This operation simply requires the removal and replacement of the axle shaft associated with either of the brake units 15 and either of the respective pair of cap screws 22. These cap screws secure a hand-hole cover 23 to the housing 21, and it will be obvious that the brake unit may be removed or replaced through the opening normally closed by the cover 23.

The differential brake units 15 are each provided with two sets of clutch disks or members 24 and 25. The drive clutch disks 24 have peripheral teeth which engage with mating teeth integral with the inner cylindrical wall of the casing of unit 15. The rotation of the unit casing as determined by the rotation of the differential casing 9 through the permanently engaged flexible coupling 14 causes the rotation of the disks 24. The disks 24 are held in position by the meshing engagement of their teeth with the mating teeth in the cylindrical casing wall. The angular surface on the inside of the disks 24 is smooth and there is a slight clearance between these surfaces and the splined portion 19 of the shaft 20 so that there is no engagement between these elements. The driven clutch disks 25 are provided with teeth about their inner surfaces which engage with the splined portions on the shaft 20 and are caused to rotate therewith. The peripheral surface of the disks 25 is smooth and a clearance is provided between this surface and the integral teeth on the interior wall of the casing unit to prevent contact between these elements. A series of helical springs 26 are positioned in a chamber provided between the inner end of the casing and pressure plate 28, which abuts the terminating clutch disk. The springs 26 may be disposed about the axle shaft 20 with their axes lying parallel with the axis of said shaft. A circular nut 27 is threaded on the outer end of the cylindrical casing 15 and functions as a retainer for the disks 24 and 25. The adjustment of this nut determines the compression to be exerted on the springs 26, and thus regulates the pressure between the disks 24 and 25. A steel wire may be introduced through openings in said nut and in the end of the casing to maintain the nut in its adjusted position. A nut 29 is threaded in the interior end of the casing 13 and serves to lock the bearing 12 against longitudinal movement and a stop 29' prevents the rotation of said nut. The casing 21 is shown as having a cover 30 bolted thereto which cooperates to furnish an enclosure for the differential gearing.

In the operation of the device the unit casing is rotated as previously described, and the disks may be rotated independently of one another when one wheel is stopped and the other wheel is revolving, due to the differential action of the gears 17 and 18. The pressure between the disks 24 and 25 resists the differential action between the two shafts 20. Thus when the reactions to turning torque for the axle shafts are equal, they will be driven together, but when said reactions are unequal one of the axle shafts tends to lag behind the other, but this action is resisted by the braking pressure between plates 24 and 25.

By means of the present invention the necessary differential action is permitted between wheels for turning corners or going around curves in the road or to compensate for a difference in tire diameters. No independent lubrication system is required in connection with the improved device as it forms part of the differential case, and the lubricant therein is suitable and sufficient to care for the entire mechanism. Should the disks or other parts of the unit 15 cease to operate through wear or other reasons, the differential will continue to function and the motor vehicle will operate in the conventional manner.

While the arrangements of this invention have been illustrated as embodied in certain specific forms which have been deemed desirable, it will be understood that it is capable of embodiment in other forms to accomplish the same purpose. For instance, it may be positioned between two axle shafts by placing it on an auxiliary shaft parallel to the axle shafts and driving the two parts of the differential brake by chains or gears from the axle shafts. Further applications from that described above may be made, for instance, by placing the improved arrangement in the front axle of a four-wheel drive truck or in the "amidships" differential of such a truck.

What is claimed is:

1. In a differential mechanism, a driving shaft and two driven shafts, a ring gear operated by said driving shaft and rotatable upon the same axis as said driven shafts, a bevel pinion gear carried by a frame associated with said ring gear and adapted to rotate on an axis at right angles to the axis of said ring gear, said bevel pinion gear being meshed with the bevel gears upon each of said driven shafts so that when the reactions to turning torque for said driven shafts are equal they will be driven with said ring gear, but when said reactions are unequal one of said driven shafts tends to lag behind the other, and a frictional connection from said ring gear to at least one of said driven shafts independently of the driving connection from said ring gear to said shafts through said bevel gears, whereby differential action between the driven shafts cannot take place until the friction of said frictional connection is overcome, said frictional connection including a removable casing surrounding the driven shaft and adapted to be engaged for rotation with said ring gear, said removable casing including a plurality of friction disks rotating therewith but movable with respect to the driven shaft and a corresponding series of disks movable with said driven shaft and frictionally engaging said first mentioned disks, a housing for the driven shafts and differential mechanism, said casing with the associated friction disks being adapted to be disengaged from said ring gear, and a removable cover upon said housing through which said casing and disks may be removed when the associated driven shaft is withdrawn.

2. In a differential mechanism, a driving shaft and two driven shafts, a rotating element operated by said driving shaft and rotatable upon the same axis as said driven shafts, a housing for said driven shafts and differential mechanism, a permanently engaged flexible coupling between said rotating element and said driven shafts, whereby when the reactions to turning torque for said driven shafts are equal, they will be driven together but, when said reactions are unequal, one of said driven shafts tends to lag behind the other, a frictional connection from said rotating element to at least one of said driven shafts independently of the flexible coupling to said shafts whereby differential action between the driven shafts cannot take place until the friction of said frictional connection is overcome, said frictional connection including a series of friction members movable with the driven shaft and another series of friction members engaged therewith and movable with the rotating element, and a casing for enclosing said friction members and removable therewith from the housing as a unit when the associated driven shaft is withdrawn.

3. In a differential mechanism, a driving shaft and two driven shafts, a rotating element operated by said driving shaft and rotatable upon the same axis as said driven shafts, a housing for said driven shafts and differential mechanism, a permanently engaged flexible coupling between said rotating element and said driven shafts, whereby when the reactions to turning torque for said driven shafts are equal, they will be driven together but, when said reactions are unequal, one of said driven shafts tends to lag behind the other, a frictional connection from said rotating element to at least one of said driven shafts independently of the flexible coupling to said shafts, whereby differential action between the driven shafts cannot take place until the friction of said frictional connection is overcome, said frictional connection including a series of friction members movable with the driven shaft and another series of friction members engaged therewith and movable with the rotating element, means for adjusting the friction of said frictional connection, and a casing for enclosing said friction members and said last mentioned means and removable from the housing with said members and said means as a unit when the associated driven shaft is withdrawn.

4. In a differential mechanism, a driving shaft and two driven shafts, a rotating element operated by said driving shaft and rotatable upon the same axis as said driven shafts, a housing for said driven shafts and differential mechanism, a permanently engaged flexible coupling between said rotating element and said driven shafts, whereby when the reactions to turning torque for said driven shafts are equal, they will be driven together but, when said reactions are unequal, one of said driven shafts tends to lag behind the other, a frictional connection from said rotating element to at least one of said driven shafts independently of the flexible coupling to said shafts whereby differential action between the driven shafts cannot take place until the friction of said frictional connection is overcome, said frictional connection including a series of friction members movable with the driven shaft and another series of friction members engaged therewith and movable with the rotating element, a casing within the housing for enclosing said friction members and forming therewith a removable unit, and a removable cover upon said housing through which said casing unit may be removed when the associated driven shaft is withdrawn.

TEMPLE C. SMITH.